July 21, 1953     E. MEYER     2,646,198

BULGE PACKING OF FRUIT

Filed Nov. 9, 1948

INVENTOR
ELY MEYER
by Hooper, Leonard & Glenn
his attorneys

Patented July 21, 1953

2,646,198

UNITED STATES PATENT OFFICE 2,646,198

BULGE PACKING OF FRUIT

Ely Meyer, Tampa, Fla., assignor to United Paper Company, Tampa, Fla., a corporation of Delaware Application November 9, 1948, Serial No. 59,141

6 Claims. (Cl. 226—17)

This invention relates to the bulge packing of citrous fruit, such as oranges and grapefruit. More particularly, it relates to the bulge packing of such fruit through the bottom of the container.

For various reasons, it has been customary for many years to bulge pack citrous fruit. In such packing, which is commonly done by hand, the fruit is heaped above the top of the box sometimes to a height of 3" in the center and a lesser distance at the ends above the sides. When the fruit is individually wrapped or even when only the top layer is wrapped for display purposes, it is also customary to place the top layer by hand with the wrapper markings in regular alignment for display purposes after the box is opened. Upon completion of the filling, it is customary to send the box or crate to a lidding machine where a flexible lid is pressed down over the top of the bulging fruit and nailed to the end pieces of the box to close it. Frequently a metallic tape is passed across the center of the box, whenever a box having a center section or partition is used and then the ends of the tape are nailed to the sides of the center partition. In order to close the open space between the sides of the box and the top lid, cardboard extensions have been used. In many cases, these extensions are fastened to the box to hold them in place during packing.

Even though reasonable care is exercised in packing in the conventional manner that has just been described, a substantial amount of spoilage occurs, in part at least, because of the crushing effect that results from the lidding operation. Part of such spoilage may also result from the crushing which may come about if the fruit is not properly settled so that each piece of fruit in the box is subjected to a substantially even pressure at the various points of contact with other pieces of fruit or with the box. Moreover, the placing of the cardboard extensions or guards and the holding of them in position, unless they are affixed to the container, represents a time-consuming operation, a drawback which is also present in the packing of fruit substantially entirely by hand.

In the present invention, the spoilage of fruit due to crushing is markedly reduced by bulge packing of the containers through the bottom. Moreover, this invention is easily adaptable to the various mechanical means for automatically packing fruit. The present invention permits of the rapid placement of cardboard extensions or guards to protect the fruit where the top lid is sprung away and permits some self-adjustment of the pieces of fruit adjacent thereto relative each other. In addition, the top layer of fruit by frictional pressure alone holds the cardboard guards securely in place in this invention. When desired, the topmost layer is packed first in display fashion, with or without wrappers, and then the balance of the fruit is poured into the box automatically. Packing the fruit with the bulge already created as it is by this novel method results in a packing which, when the bottom is placed thereon, is transportable with less spoilage than in the case of fruit packed in the usual manner.

Other objects and advantages of this invention will be evident from the further consideration of this specification and the claims appended hereto and from the drawings, in which:

Figure 1:
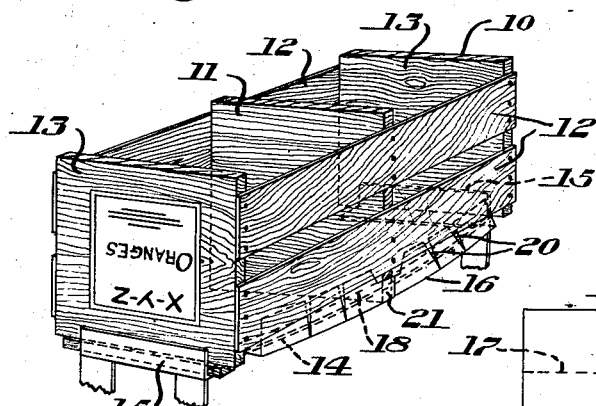
Figure 1 is a perspective view illustrating an orange box having an extended center partition and preformed bulge in position for bulge packing through the bottom in accordance with the present invention.

Referring to Figure 1 of the drawings, 10 is a box having a center section or partition 11, sides 12 and ends 13. The interior dimensions of each half of a standard crate or box usually measure 12" x 12" x 12" although it is evident that boxes of different dimensions may be employed. In box 10, the center section 11 extends above the top of the sides 12 about the distance, usually from 1½ to 3", which measures the amount of bulge desired in that particular type of packing. A lid 14 is fastened to the tops of the ends 13 by staples, nails or metallic tape and may or may not be fastened in a similar fashion at the center thereof to center section 11. While the embodiment shown in Figure 1 has an extended center section, the present invention is also applicable to the use of standard boxes, the center sections of which do not extend above the top of the sides.

For filling, box 10, as illustrated in Figure 1, is placed in position bottom side up and open on the spaced angle bars 15 which support the box at the ends. This arrangement is one of many possible arrangements designed to hold box 10 with its preformed bulge in position to receive fruit either manually or automatically. If additional support is wanted, the spaced bars 15 can be connected by a substantially taut canvas apron or by a rigid curved surface which accommodates the preformed bulge. When boxes are used which do not have a center section or in which the center section is not extended, similar provision must be made for the bulging of the top lid as the box is filled with fruit. In the embodiment shown, there is sufficient strength in box 10 to require support during filling only across the ends 13.

Figure 2:
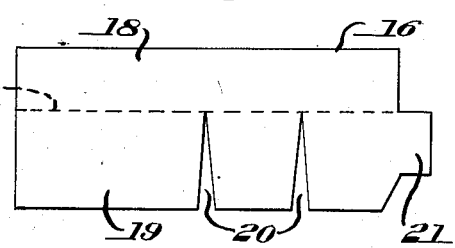
Figure 2 is a plan view of a cardboard guard adapted for use with the container shown in Figure 1.

With box 10 in position the cardboard guards 16 can be placed. These guards are stamped in the shape, as shown in Figure 2, and are longitudinally scored along a line 17. The upper portion 18 of the guard above the scoring line 17 is preferably a rectangular flat piece of cardboard of sufficient dimension to close any gap left between the sides 12 and the bulged lid 14 of the box 10. The lower part 19 of the guard has cutout or notched portions 20 to enable portion 18 to assume the curvature of the lid 14 without any substantial folding or overlapping of any part of the lower portion 19. At one end of lower portion 19 there is an extension 21. Guard 16 is prepared for use by folding along line 17 in the appropriate direction to form a right angle between portions 18 and 19. The direction of folding is made in such a way as to allow extension 21 to be inserted next to the uppermost edge of the sides of center section 11 above the top of the sides 12 as shown in Figure 1. With box 10 in position ready for filling, the attendant can easily and readily place four cardboard guards where they will remain without being held until box 10 is filled with fruit.

As filling of box 10 proceeds, preferably automatically, except for the first layer next to the top lid 14 which may be packed by hand for display purposes, the box may be shaken to assist the fruit to move quickly and naturally into that position in which the pressure will be most even on each piece. The filling is completed when the fruit, usually a predetermined number of pieces of a certain size, reaches the level defined by the bottoms of the sides 12 and the ends 13. Normally, there will be no bulge on the bottom side of the box which is closed by a cover of the same material as lid 14 which bottom cover is nailed shut to the bottoms of the end pieces 13 and possibly also to the bottom of center section 11. In some cases a much stronger bottom cover may be used and attached to the bottom of box 10 to prevent any bruising or crushing of the fruit through a more flexible bottom. It is possible to create some bulging on the bottom and to allow therefor, particularly if the fruit is to be shipped with the boxes standing on end. When a thin flexible bottom is so used, cardboard guards may readily be inserted before the last layer of fruit runs into the box, so that the openings on both sides due to the bulge will be protected.

Thus, in this invention, the fruit is settled in place, inclusive of the bulge area, quickly and expeditiously and without detrimental crushing. In standard packing situations the bulge configuration is forced on the fruit rather than having the fruit conform to or naturally develop the bulge during packing.

Figure 3:
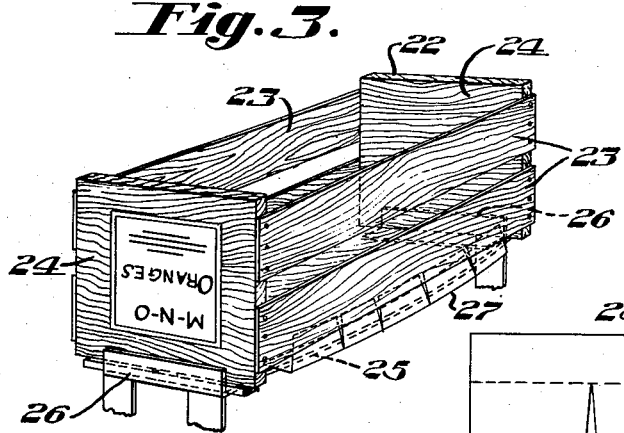
Figure 3 is a perspective view of a standard box which has no center section in position for bottom packing in accordance with the method of this invention.
Figure 4:
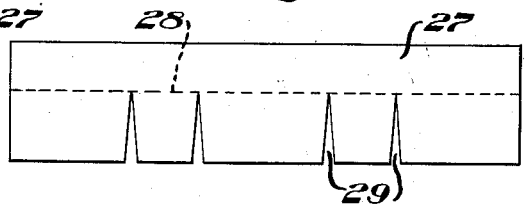
Figure 4 is a plan view of a cardboard guard suitable for use with the box shown in Figure 3.

In Figure 3 there is illustrated a standard citrous fruit box 22 of the type which has no center section at all. This box comprises sides 23 and ends 24. A regular lid 25 is fastened to the box along the tops of the ends 24. Box 22 is placed between spaced angle bars 26 similar to bars 15 or in a cradle or other holder which will permit the fruit to bulge top lid 25 as filling proceeds. Before any fruit is allowed to flow into the box, cardboard extensions or guards 27 are folded along the scored lines 28 and placed in position in the same manner as the guards 16 are placed and for the same purpose, except that guards 27 do not have any extension 21 thereon. Guards 27 may be made as long as the interior dimension of box 22, although usually a somewhat shorter length is equally satisfactory. With the longer length, the abutment on the inside of the ends 24 of the box with the ends of the guards 27 will assist in holding guards 27 in place during the commencement of filling. These guards, as are guards 16, are substantially entirely held in position by the frictional pressure of the fruit contained in the respective boxes. The recesses 29 enable the unrecessed side of guards 27 to accommodate the curvature of lid 25 in the same manner as in the case of guards 16 which serve the same purpose.

Figure 5:
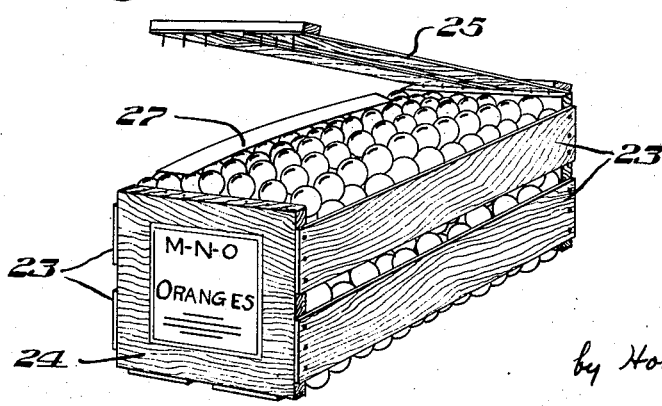
Figure 5 is a perspective view of a box, such as is shown in Figure 3, which has been packed, shipped and opened for display after the remaining guard is removed.

Although the present method of bulge packing through the bottom can be done wholly automatically from automatic counting and filling machines, a substantial amount of such packing has the topmost layer display packed. In such cases, when wrappers are used, an attendant individually places the topmost layer respectively in the boxes 10 and 22 with the wrapper design facing downwardly and the wrapper twist facing upwardly. In addition, the wrappers would be all arranged in the same direction relative the design or any reading matter thereon to enhance their appearance when the box is opened. When so opened by the complete or partial removal of the top lid, such wrapper markings would be uppermost and achieve the intended display effect. In Figure 5 there is illustrated a box of the character shown in Figure 3 which has had the topmost layer, which is, of course, bottommost during the actual packing, hand packed for display, and which was automatically filled as to the balance of the pieces of fruit therein which are automatically counted. After filling, the bottom cover is placed on the box and fastened to ends 24 with sometimes an intermediate fastening of metallic binding tape. Upon arrival at destination, the lid 25 is opened and the fruit presents the appearance illustrated in Figure 5, after one guard 27 has been removed and the other awaits removal to complete the readying of the box for sale display.

Although I have illustrated and described but two present preferred embodiments of the invention, it will be recognized that changes in the details and arrangements may be made without departing from the spirit of the invention or the scope of the appended claims.

I claim:

1. In a method of bulge packing fruit, the steps comprising, providing a rectilinear container having an open bottom and with its top lid affixed in place and having a preformed bulge therein, said top lid being flexible and so affixed substantially only across its ends, supporting said container substantially by its ends only with its bottom uppermost, covering any opening between the sides of said container and said top lid with a generally horizontally extending relatively stiff angle-like fibrous guard, filling said container with fruit through the bottom with fruit whereby said fruit will hold said fibrous guards in place by frictional pressure between said fruit, said top lid and said container, and affixing a bottom to said container before shipment of said filled container.

2. In a method of bulge packing fruit, the steps comprising, providing a standard rectilinear container for citrous fruit having the bottom thereof open and the top lid thereof fastened thereto substantially only across the ends thereof, said top lid being flexible, supporting said container with said bottom uppermost and substantially only by its ends to permit said top lid to bulge as said container is filled, filling said container with fruit, and affixing a bottom cover to said container before shipping said filled container.

3. In a method of bulge packing fruit, the steps comprising, providing a standard rectilinear container for citrous fruit having the bottom thereof open and the top lid thereof fastened thereto substantially only across the ends thereof, said top lid being flexible, supporting said container with said bottom uppermost and substantially only by its ends to permit said top lid to bulge as said container is filled, filling said container with fruit, shaking said container, and affixing a bottom cover to said container before shipping said filled container.

4. In a method of bulge packing fruit, the steps comprising, providing a standard rectilinear container for citrous fruit having an open bottom and having the top lid affixed thereto only at the ends thereof, said top lid being flexible, supporting the ends only of said container with said bottom uppermost to permit said top lid to bulge as said container is filled, placing folded cardboard guards within said container and substantially along the angles formed between the sides and top lid of said container, filling said container with fruit and thereby causing said fruit to bulge said top lid and to hold said guards by frictional pressure against said sides and top lid while covering the openings caused by the bulging of said top lid, and affixing a bottom cover to said container before shipping said filled container.

5. In a method of bulge packing fruit, the steps comprising, providing a rectilinear container having an open bottom and a flexible top lid affixed thereto substantially only across its ends to permit the bulging thereof, supporting said container substantially by its ends with said bottom uppermost on spaced supports to permit said top lid to bulge, filling said container with fruit whereby said top lid is caused to bulge under the weight thereof, and affixing a bottom cover to said container before shipment thereof.

6. In a method of bulge packing fruit, the steps comprising, providing a rectilinear container open at the bottom and having a flexible top lid affixed thereto, said top lid being so affixed at the ends thereof to permit the bulging of said top lid to take place, placing said container with said bottom uppermost on spaced supports, placing substantially straight folded cardboard guards along the sides and within said container in the angles between said sides and said top lid and overlapping the same, display packing the layer of fruit adjacent said top layer, filling the remainder of said container thereby causing the bulging of said top lid, and affixing a bottom cover to said container before the shipment thereof.

ELY MEYER.

References Cited in the file of this patent

UNITED STATES PATENTS

| Number | Name | Date |
| --- | --- | --- |
| 659,949 | Arrasmith | Oct. 16, 1900 |
| 844,275 | Fleming | Feb. 12, 1907 |
| 990,403 | Stelling | Apr. 25, 1911 |
| 1,617,963 | Reshan | Feb. 15, 1927 |
| 1,847,201 | Wadsworth | Mar. 1, 1932 |
| 1,888,495 | Dudley | Nov. 22, 1932 |
| 1,894,531 | Bruntsch | Jan. 17, 1933 |
| 1,930,218 | Wiggins et al. | Oct. 10, 1933 |
| 1,930,374 | Trew et al. | Oct. 10, 1933 |
| 2,065,150 | O'Brien | Dec. 22, 1936 |
| 2,134,437 | Chewning | Oct. 25, 1938 |
| 2,168,784 | Scott | Aug. 8, 1939 |
| 2,202,616 | Bishop | May 28, 1940 |